ID

US009609878B2

(12) United States Patent
Foda et al.

(10) Patent No.: US 9,609,878 B2
(45) Date of Patent: Apr. 4, 2017

(54) OVEN TO BAKE FOOD PRODUCTS

(71) Applicant: Electrolux Professional S.p.A., Pordenone (IT)

(72) Inventors: Alberto Foda, Vittorio Veneto (IT); Claudio Marchesin, Pordenone (IT); Paolo Cescot, Cordenons (IT)

(73) Assignee: ELECTROLUX PROFESSIONAL S.P.A., Pordenone (IT)

( * ) Notice: Subject to any disclaimer, the term of this patent is extended or adjusted under 35 U.S.C. 154(b) by 212 days.

(21) Appl. No.: 14/617,039

(22) Filed: Feb. 9, 2015

(65) Prior Publication Data
US 2015/0230479 A1 Aug. 20, 2015

(30) Foreign Application Priority Data

Feb. 14, 2014 (IT) .......................... TO2014A000129

(51) Int. Cl.
*A21B 1/50* (2006.01)
*A21B 3/07* (2006.01)
*A21B 3/02* (2006.01)
*F24C 15/02* (2006.01)

(52) U.S. Cl.
CPC .................. *A21B 1/50* (2013.01); *A21B 3/02* (2013.01); *A21B 3/07* (2013.01); *F24C 15/021* (2013.01)

(58) Field of Classification Search
CPC .... A21B 1/50; A21B 3/07; A21B 3/02; F24C 15/021
USPC ... 126/337 R, 339, 340, 21 R; 219/400, 401; 244/118.1, 118.5
See application file for complete search history.

(56) References Cited

U.S. PATENT DOCUMENTS

| 3,633,518 A | * | 1/1972 | Simmonds | A21B 1/50 126/19 R |
| 5,413,292 A | * | 5/1995 | Luria | B60L 9/00 105/327 |
| 8,662,066 B2 | * | 3/2014 | Franzolin | F24C 15/021 126/19 R |
| 2004/0194487 A1 | * | 10/2004 | Leroy | A47B 31/02 62/237 |
| 2006/0102164 A1 | * | 5/2006 | Rabe | A21B 1/44 126/190 |
| 2011/0226229 A1 | * | 9/2011 | Franzolin | F24C 15/021 126/19 R |

(Continued)

FOREIGN PATENT DOCUMENTS

| IT | EP1382250 A1 * | 1/2004 | ............... A21B 3/07 |
| KR | 2013106026 A * | 9/2013 | ............... A47J 27/04 |
| KR | 1526523 B1 * | 6/2015 | ............... F24C 15/02 |

*Primary Examiner* — Gregory Huson
*Assistant Examiner* — Nikhil Mashruwala
(74) *Attorney, Agent, or Firm* — Pearne & Gordon LLP

(57) ABSTRACT

Oven to bake food products including a baking chamber (4), a door (6) for closing the baking chamber (4), and a trolley (12) equipped with pan racks (14) superimposed upon each other and movable between an operating position, in which the pan racks (14) are inserted inside the baking chamber (4), and an extracted position, in which the pan racks (14) are arranged outside the said baking chamber (4). The door (6) has at least one cavity (23), which is configured to house within it a portion (18) of the trolley (12) protruding outside the baking chamber (4) when the trolley (12) is arranged in its operating position, and is closed by at least one flap (28).

15 Claims, 7 Drawing Sheets

(56) References Cited

U.S. PATENT DOCUMENTS

2015/0069179 A1\* 3/2015 Ehlers et al. .......... B64D 11/04
  244/118.5
2015/0314872 A1\* 11/2015 Holtorf et al. ......... B64D 11/04
  244/118.5

\* cited by examiner

OVEN TO BAKE FOOD PRODUCTS

This invention relates to an oven to bake foodstuffs.

In particular, this invention relates to an oven of a professional type equipped with a tray-carrying trolley, commonly referred to as a "trolley".

This type of oven generally comprises a first support frame; a baking chamber, which is located inside the first support frame and opens outwards at a front face of the first support frame; a door for closing the baking chamber; and a trolley, which has a second support frame and is equipped with a plurality of tray-carrying shelves superimposed upon each other.

The trolley is movable between an operating position, in which the pan racks are inserted inside the baking chamber, and in an extracted position, in which the pan racks are arranged outside the said baking chamber.

When the trolley is arranged in its operating position, a portion of the second support frame protrudes out of the baking chamber, and is housed inside a corresponding cavity made in the door.

The oven also has a sealing device to make the baking chamber fluid-tight with the door both when the trolley is arranged in its operating position, and when the trolley is arranged in its extracted position.

The sealing device normally comprises a first annular seal fixed to the front face of the first support frame around the perimeter of the baking chamber, and a second straight seal, which is fixed to the door above the said cavity, and is substantially the same width as the door.

When the trolley is arranged in its operating position and the oven door is closed, the baking chamber is made fluid-tight by the coupling of the first gasket and the second gasket with a sealing plate, which is integral with the second support frame, and faces on one side the baking chamber and on the other side the external environment.

The sealing device also comprises a closing panel, which is hooked to the front face of the first support frame when the trolley is arranged in its extracted position, engages the said cavity when the oven door is closed, and guarantees that the baking chamber is rendered fluid-tight by coupling with the first gasket and with the second gasket in a completely similar way to the function performed by the said sealing plate when the trolley is in its operating position.

Known ovens for baking foodstuffs of the type described above have some drawbacks deriving chiefly from the fact that their use necessarily involves intervention by the user to hook the closing panel onto the first support frame when the trolley is extracted from the baking chamber and to remove the closing panel when the trolley is again arranged in its operating position.

Furthermore, it is possible that the user may forget to hook the first closing panel onto the first support frame in the absence of the trolley thus compromising the oven's seal resulting in energy inefficiency of the oven and danger for the user due to water and/or hot flows exiting into the surrounding environment (for example during the stages of pre-heating or washing the baking chamber, which are performed in the absence of the trolley).

The aim of the present invention is to produce an oven to bake foodstuffs which overcomes the above-described drawbacks and which is simple and economical to make.

According to the present invention, an oven to bake foodstuffs is produced as claimed in the accompanying claims.

In particular, the present invention relates to an oven to bake foodstuffs comprising:

a first support frame;

a baking chamber, which is obtained inside the first support frame and opens outwards in correspondence to a front face of the first support frame;

a door to close the baking chamber;

a trolley, which has a second support frame, is provided with a plurality of pan racks arranged one on top of the other, and moveable between an operating position, in which the pan racks are inserted into the baking chamber, and an extracted position, in which the pan racks are arranged on the outside the said baking chamber; and a sealing device to close the baking chamber with the door in a fluid-tight manner both when the trolley is arranged in its operating position, and when the trolley is arranged in its extracted position.

The second support frame has a plurality of projecting portions which, when the trolley is arranged in its operating position, extend outside of the baking chamber.

The sealing device delimits at least one housing cavity obtained in the door so as to house on the inside the projecting portions and has a plurality of openings, which are configured to allow the projecting portions to access the housing cavity, are obtained in correspondence to the inner face of the door and are equal in number to the projecting portions.

The door has, for each opening, a respective closing device to close the opening itself, when the corresponding projecting portion of the trolley is arranged outside the housing cavity.

Preferably, each closing device comprises at least one flap which is moveable between an opening position and a closing position of the relative opening.

In a possible embodiment, each closing device comprises a pair of flaps which are hinged to the sides of the relative opening and are moveable between an opening position and a closing position of the relative said opening.

Each flap is preferably mounted to rotate about a vertical rotation axis.

Furthermore, each of the said flaps is preferably configured to move from its closing position to its opening position due to the thrust of the corresponding projecting portion of the trolley.

Each closing device may comprise, for each flap, a respective elastic thrust device to move, and normally hold, the flap itself to its closing position.

In a preferred embodiment, the sealing device comprises a structural element, which delimits the housing cavity and is integral to a lower portion of the door. In this case, the above-mentioned openings are made in this structural element.

Each projecting portion may comprise an upright which is integral to the second support frame.

In a possible embodiment, the trolley also comprises, furthermore, a coupling plate which is delimited by a first coupling face, which is suited to be coupled to the front face of the first support frame, and by a second coupling face, which is suited to be coupled to the inner face of the door.

The oven may also comprise, furthermore, at least one first gasket, which is interposed between the front face of the first support frame and the first coupling face of the coupling plate, and is closed in a ring shape around the baking chamber.

This first gasket can be fixed to the front face of the first support frame or partly on the front face of the first support frame and partly on the first coupling face of the coupling plate.

The oven may also comprise a second gasket, which is interposed between the inner face of the door and the second coupling face of the coupling plate, extends horizontally and has a length at least equal to a width of the opening of the baking chamber.

This second gasket may be fixed on the inner face of the door and/or on the second coupling face of the coupling plate.

Furthermore, the second gasket may be arranged, when the door is closed, above the projecting portions of the second support frame.

The sealing device may comprise a third gasket, which is interposed between the inner face of the door and the second coupling face of the coupling plate, and extends, when the door is closed, around part of the opening of the baking chamber.

The third gasket may have two free ends connected with the second gasket, and is mounted partly on the structural element and partly on the flaps.

In a possible embodiment, the oven comprises a hooking device to lock each flap in its closing position.

This hooking device may comprise, for each flap, at least one respective magnetic element mounted on the flap or on the first support frame.

Preferably, the sealing device is mounted in a removable manner on the door.

The present invention will now be described with reference to the accompanying drawings, which show a non-limiting embodiment thereof, in which.

Figure 1:
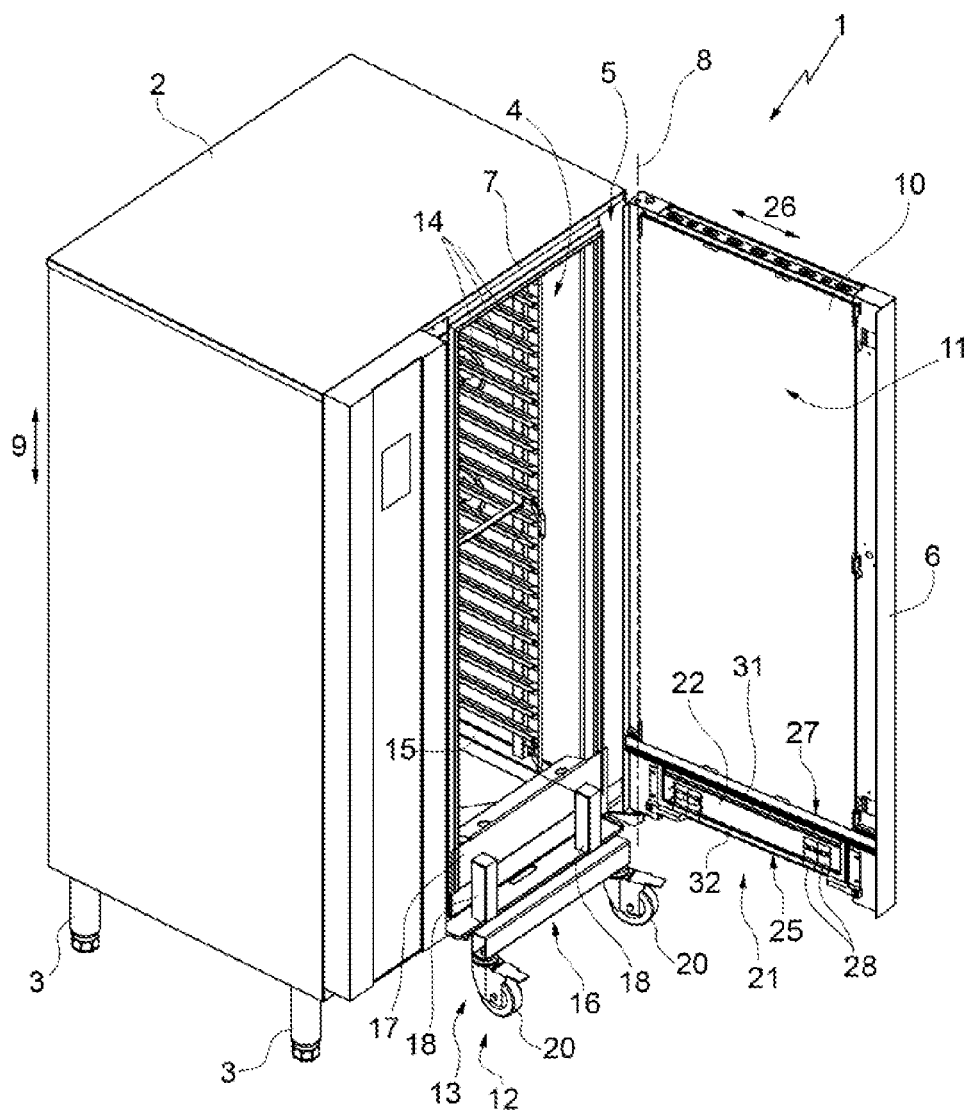
FIG. 1 is a schematic perspective view of a preferred embodiment of the oven of the present invention shown in a configuration with the door open.
Figure 2:
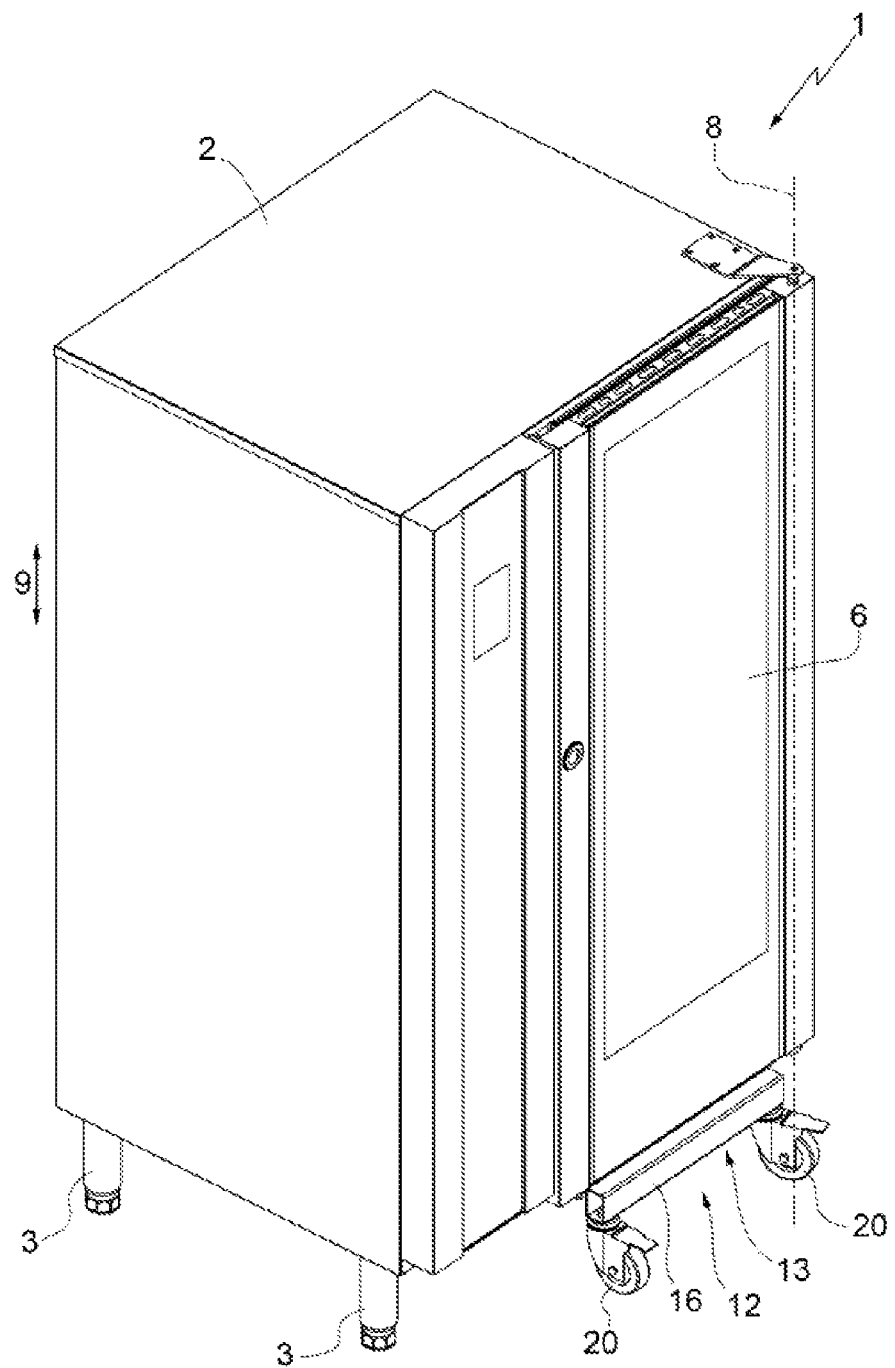
FIG. 2 is a schematic perspective view of the oven in FIG. 1 shown in a configuration with the door closed.

With reference to FIGS. 1, 2, 3 and 4, 1 indicates, as a whole, an oven for baking foodstuffs provided with a main body comprising a boxed containment frame 2 mounted in contact with the ground by means of a plurality of supporting feet 3 protruding downwards from the said frame 2.

Inside the frame 2 is a baking chamber 4, which has a substantially parallelepiped shape with a substantially rectangular section, opens outwards at a substantially flat face 5 of the frame 2, and is connected to a closing door 6.

The frame 2 is equipped with an annular seal 7 fixed to the face 5 around the perimeter of the chamber 4.

The door 6 is hinged to the frame 2 in order to rotate, in relation to the said frame 2, about a fulcrum axis 8 parallel to a substantially vertical direction 9 between a closing position and an opening position of the chamber 4.

The door 6 comprises an internal panel 10 made, for example, of glass and defining part of an inner face 11 of the said door 6.

The oven 1 also comprises a self-propelled trolley 12, in turn comprising a support frame 13 and a plurality of pan racks 14 superimposed upon each other and carried by said frame 13.

The trolley 12 is movable between an operating position, in which at least part of the trolley 12 (in particular the shelves 14) is arranged inside the chamber 4, and an extracted position, in which the trolley 12 is arranged entirely outside the said chamber 4.

More precisely, when the trolley 12 is arranged in its operating position, the frame 13 has a portion 15 extending inside the chamber 4 and a portion 16 extending outside the said chamber 4.

Figure 7:
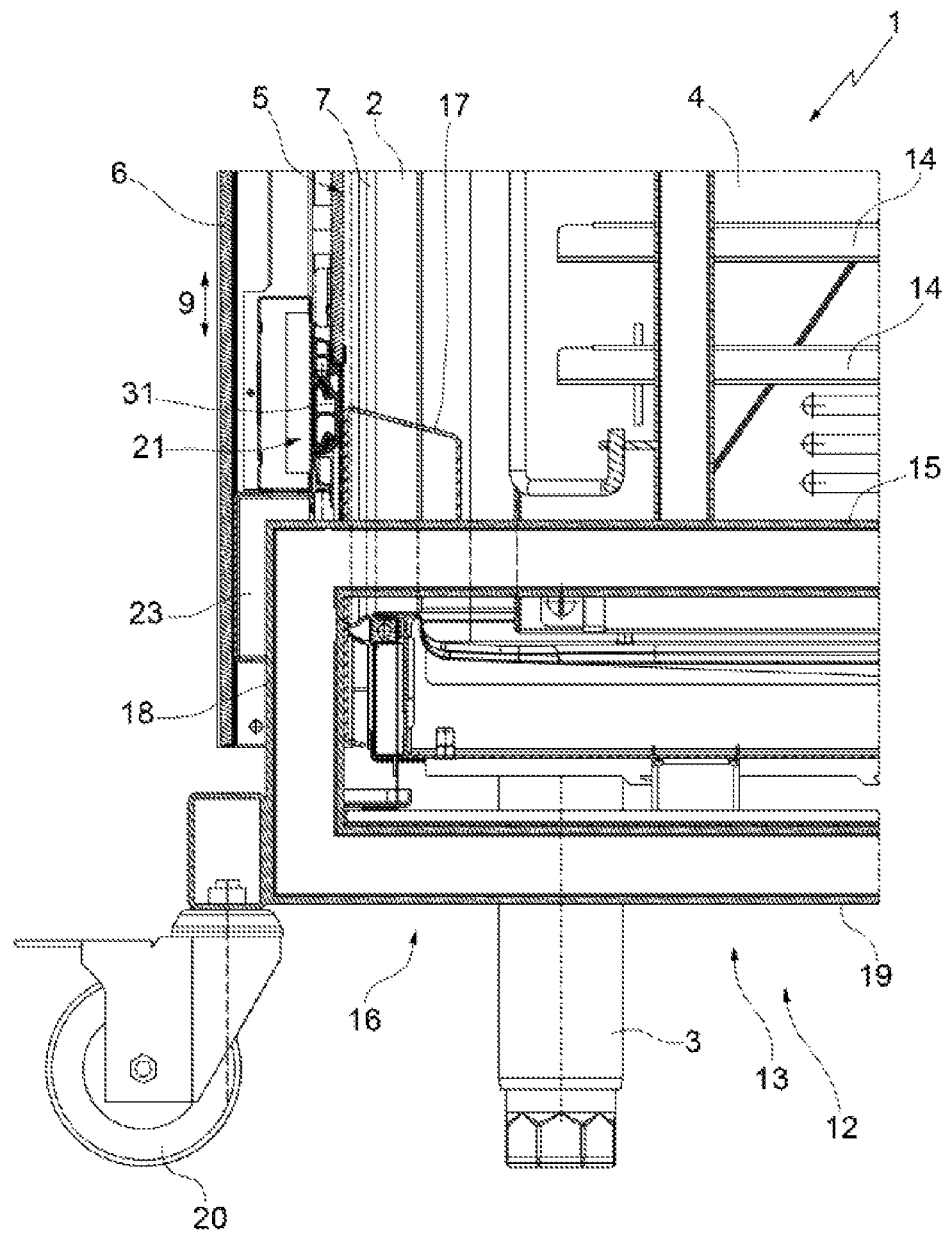
FIG. 7 is a schematic side view, with parts shown in cross-section for clarity, of a second detail of FIG. 2.

The portion 16 comprises a substantially flat coupling plate 17 arranged in contact with the face 5 of the frame 2 when the trolley 12 is in its operating position; a pair of vertical structural uprights 18, which are fixed to the plate 17, and protrude downwards from the said plate 17; a pair of horizontal cross-members 19 (FIG. 7) extending between the ground and the frame 2; and a plurality of wheels 20 to move the trolley 12.

According to some variations not shown, there are more than two uprights 18.

The oven 1 also comprises a sealing device 21, which is mounted beneath the panel 10 of the door 6, and cooperates with a seal 7 to make the chamber 4 fluid-tight with the door 6 both when the trolley 12 is arranged in its operating position and when the trolley 12 is arranged in its extracted position.

In other words, when the trolley 12 is arranged in its extracted position and the door 6 is closed, the device 21 replaces the trolley 12 by making the chamber 4 fluid-tight.

The device 21 comprises a fixed structural element defined by a plate 22, which is fixed to a frame of the door 6 beneath the panel 10, and is configured to delimit within itself at least one cavity 23 to house at least part of the uprights 18.

The device 21 also has a plurality of openings 24, which are made in the plate 22, are equal in number to the number of uprights 18, are spaced the same distance apart as the uprights 18, and allow the uprights 18 to access the cavity 23.

The openings 24 open outwards at the inner face 11 of the door 6 and at a bottom edge 25 of the door 6 parallel to a direction 26 substantially horizontal and transverse to direction 9.

Each opening 24 allows the insertion of the relative upright 18 inside the cavity 23, which is configured to house within it at least part, in particular at least the top part, of the said upright 18 when the trolley 12 is arranged in its operating position and the door 6 is closed.

Each opening 24 is closed by a relative closing device 27.

In the present case, the device 27 comprises two flaps 28, each of which is hinged to the plate 22 at a relative side of the opening 24 in order to rotate into the cavity 23 about a relative fulcrum axis 29 parallel to direction 9.

According to a variation not shown, each device 27 comprises only one flap hinged to the plate 22 at one side of the opening 24.

When the trolley 12 is arranged in its extracted position or when the trolley 12 is arranged in its operating position and the door 6 is open, each flap 28 is held in a closing position of the relative opening 24 by means, preferably, of a torsion spring 30 interposed between the plate 22 and the said flap 28.

When the trolley 12 is arranged in its operating position and the door 6 is closed, the flaps 28 are moved against the action of the springs 30 into an opening position of the relative openings 24 by the thrust exerted by the relative uprights 18 during the closing of the said door 6 enabling the entry of the uprights 18 into the cavity 23.

Figure 3:
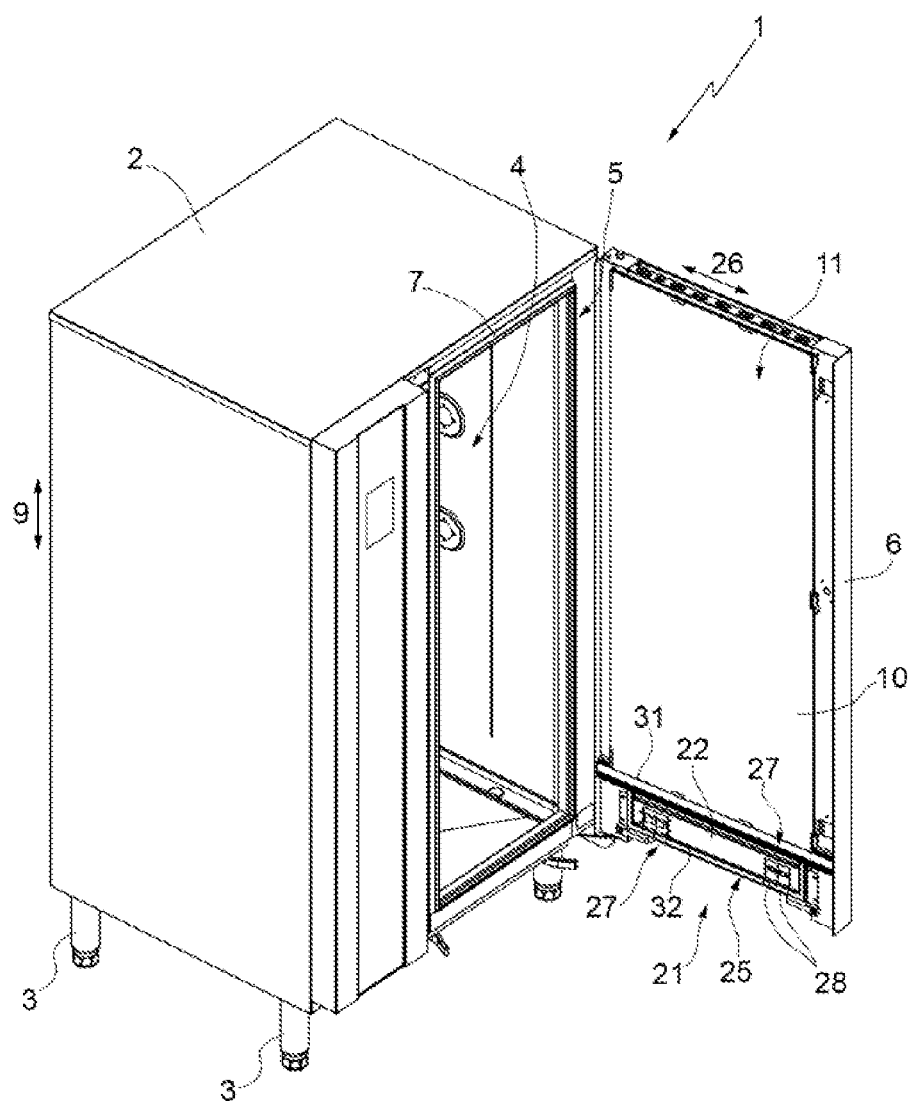
FIG. 3 is a schematic perspective view of the oven in FIG. 1 with the absence of the trolley.
Figure 4:
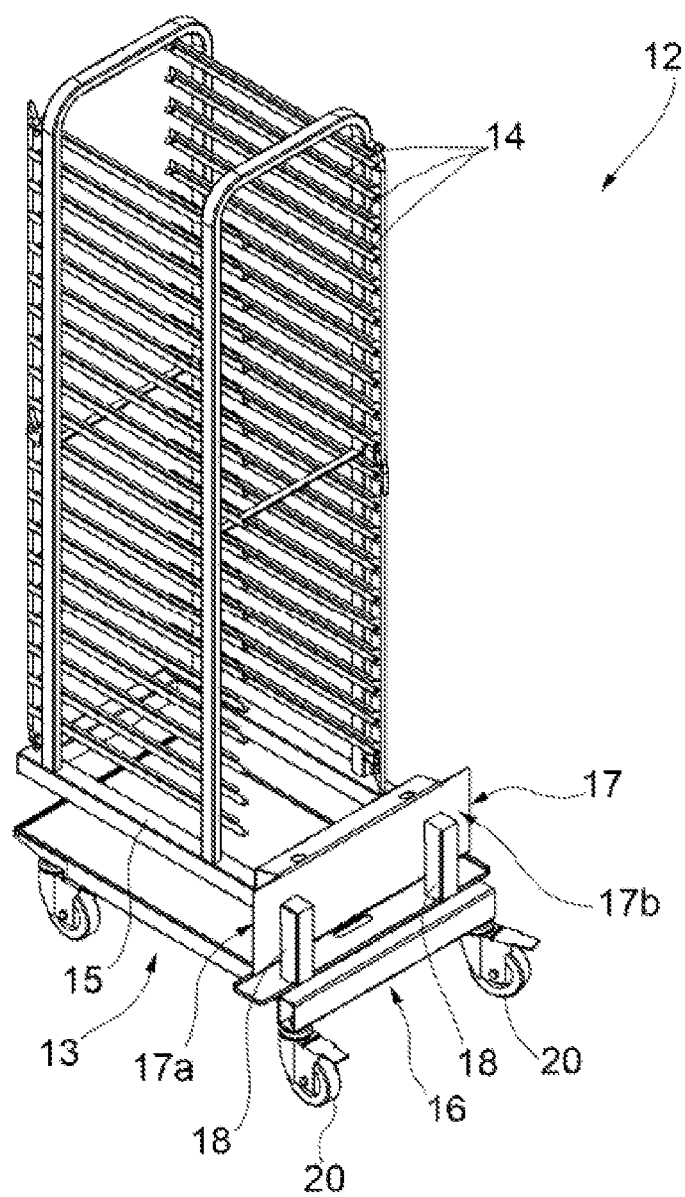
FIG. 4 is a schematic perspective view of the trolley of the oven in FIGS. 1 and 2.
Figure 5:
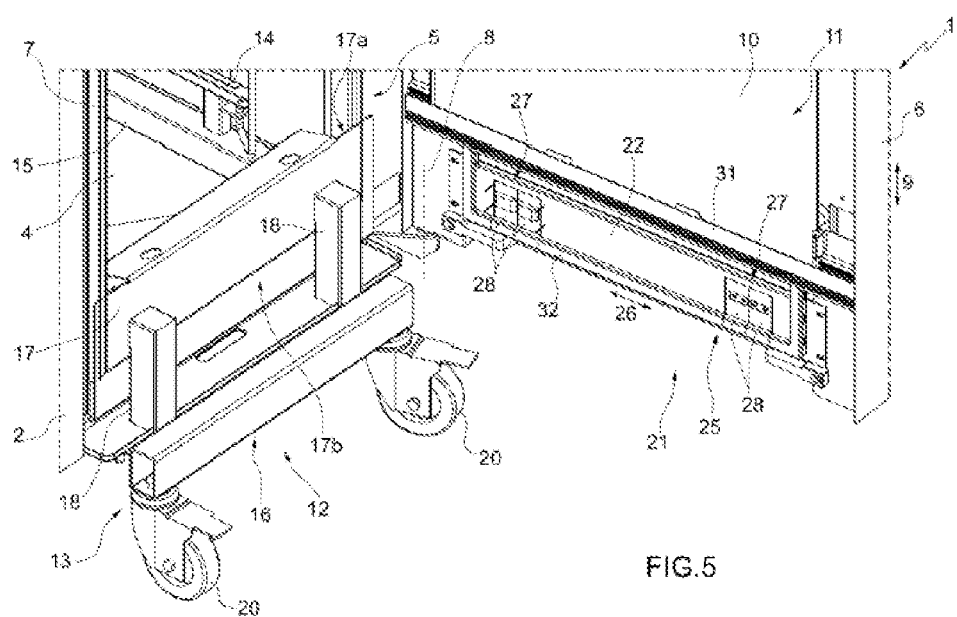
FIG. 5 is a schematic perspective view of a detail of FIG. 1.

According to that shown in FIGS. 3 and 5, the door also has, in the present case, a straight seal 31, which is fixed to the frame of the door 6 beneath the panel 10 and above the plate 22, extends parallel to the direction 26 and has a length, measured parallel to the direction 26, greater than the horizontal width of the opening of the chamber 3.

The device 21 comprises an additional seal 32, which is U-shaped, extends beneath the seal 31, has two free ends arranged substantially in contact with the seal 31, and is fixed partly to the plate 22 and partly to the flaps 28.

When the trolley 12 is arranged outside the chamber 4 and the door 6 is closed, the chamber 4 is made fluid-tight by the coupling of the seal 7 with the panel 10 of the door 6 and with the seal 32.

Figure 6:
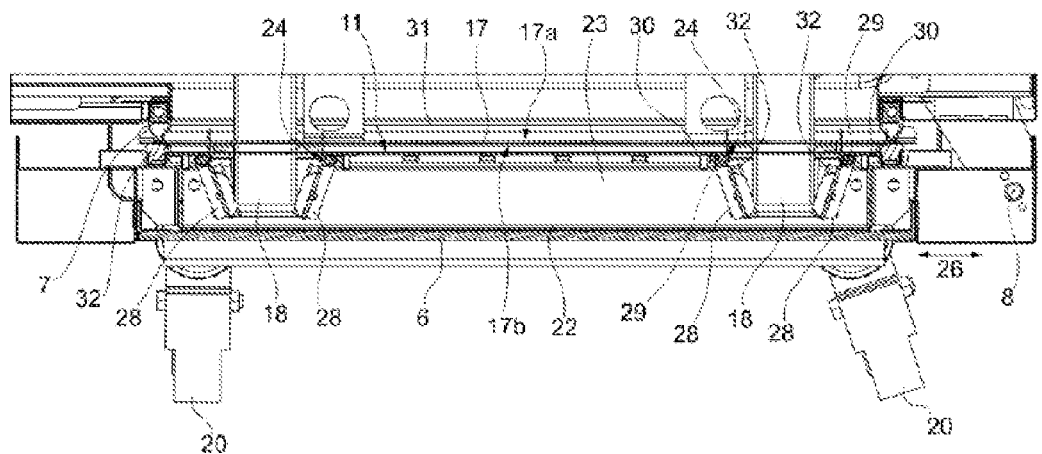
FIG. 6 is a schematic plan view, with parts shown in cross-section for clarity, of a first detail of FIG. 2.

When the trolley 12 is arranged in its operating position, meaning that it is inside the chamber 4, and the door 6 is closed, the bottom part of the chamber 4 is made fluid-tight by the coupling of the seal 7 with a first coupling face 17a of the plate 17 facing the chamber 4 and of the seal 31 with a second coupling face 17b of the plate 17 opposite the said face 17a (FIGS. 6 and 7), whereas the top part of the chamber 4 is made fluid-tight by the coupling of the seal 7 with the panel 10 of the door 6.

When the door 6 is closed, the device 21 therefore guarantees that the chamber 4 is made fluid-tight both when the trolley 12 is arranged in its operating position and when the trolley 12 is arranged in its extracted position.

According to some variations which are not shown:

the plate 22 of the device 21 is hooked in a removable manner to the door 6 and the device 21 is therefore a removable kit;

the openings 24 are made in the frame of the door 6, if the frame extends around the entire perimeter of the door 6, or directly in the panel, if the panel 10 extends substantially up to the bottom edge of the said door 6;

the seal 32 is eliminated and the fluid-tight seal of the chamber 4 is guaranteed, when the trolley 12 is extracted from the chamber 4, by the coupling of the seal 7 with the plate 22;

the flaps 28 are locked in their closing positions of the relative openings 24 by means of respective magnets, which are alternative or auxiliary to the springs 30, and are mounted on the flaps 28 and/or on the face 5 of the frame 2 at the said flaps 28;

the two flaps 28 of each opening 24 are eliminated and replaced with only one flap, which substantially has the same dimensions as two flaps 28, and is hinged about a vertical fulcrum axis;

the seal 31 is mounted in the top part of the face 17b of the plate 17 so as to couple with the panel 10 when the door 6 is closed; and the cavity 23 is unique and extends from one opening 24 to the other or the cavities 23 are the same in number as the number of openings 24 (which could also be more than two), and are separated from each other by walls or other dividing elements.

The invention claimed is:

1. Oven to bake food products comprising:
a first support frame (2);
a baking chamber (4), which is obtained inside the first support frame (2) and opens outwards in correspondence to a front face (5) of the first support frame (2);
a door (6) to close the baking chamber (4), the door (6) having an inner face (11);
a trolley (12), which has a second support frame (13), is provided with a plurality of pan racks (14) arranged one on top of the other, and is movable between an operating position, in which the pan racks (14) are inserted into the baking chamber (4), and an extracted position, in which the pan racks (14) are arranged on the outside of the baking chamber (4); and
a sealing device (21) to close the baking chamber (4) with the door (6) in a fluid-tight manner both when the trolley (12) is arranged in its operating position, and when the trolley (12) is arranged in its extracted position;
the second support frame (13) having a plurality of projecting portions (18), which, when the trolley (12) is arranged in its operating position, extend outside of the baking chamber (4);
and characterized in that:
the sealing device (21) delimits at least one housing cavity (23) obtained in the door (6) so as to house, on the inside, the projecting portions (18) and has a plurality of openings (24), which are configured to allow the projecting portions (18) to access the housing cavity (23), are obtained in correspondence to the inner face (11) of the door (6), and are equal in number to the projecting portions (18); and
the door (6) has, for each opening (24), a respective closing device (27) to close the opening (24) itself, when the corresponding projecting portion (18) of the trolley (12) is arranged on the outside the housing cavity (23).

2. Oven according to claim 1, wherein each closing device (27) comprises at least one flap (28) which is moveable between an opening position and a closing position of the relative opening (24).

3. Oven according to claim 1, wherein each closing device (27) comprises a pair of flaps (28) which are hinged to the sides of the relative opening (24) and are moveable between an opening position and a closing position of the relative opening (24).

4. Oven according to claim 2, wherein each flap (28) is mounted so as to rotate about a vertical rotation axis (29).

5. Oven according to claim 2, wherein each flap (28) is configured to move from its closing position to its opening position due to the thrust of the corresponding projecting portion (18) of the trolley (12).

6. Oven according to claim 2, wherein each closing device (27) comprises, for each flap (28), a respective elastic thrust device (30) to move, and normally hold, the flap (28) itself to its closing position.

7. An oven according to claim 1, wherein the sealing device (21) comprises a structural element (22), which delimits the housing cavity (23) and is integral to a lower portion of the door (6); the openings (24) being obtained in said structural element (22).

8. Oven according to claim 1, wherein each projecting portion (18) comprises an upright, which is integral to the second support frame (13).

9. Oven according to claim 1, wherein the trolley (12) comprises, furthermore, a coupling plate (17) which is delimited by a first coupling face (17a), which is suited to be coupled to the front face (5) of the first support frame (2), and by a second coupling face (17b), which is suited to be coupled to the inner face (11) of the door (6).

10. Oven according to claim 9 and comprising, furthermore, at least one first gasket (7), which is interposed between the front face (5) of the first support frame (2) and the first coupling face (17a) of the coupling plate (17), and is closed in a ring shape around the baking chamber (4).

11. Oven according to claim 10, wherein the first gasket (7) is fixed to the front face (5) of the first support frame (2)

or partly on the front face (5) of the first support frame (2) and partly on the first coupling face (17*a*) of the coupling plate (17).

12. Oven according to claim 9 and comprising, furthermore, a second gasket (31), which is interposed between the inner face (11) of the door (6) and the second coupling face (17*b*) of the coupling plate (17), extends horizontally, and has a length that is at least equal to a width of the opening of the baking chamber (4).

13. Oven according the claim 12, wherein the second gasket (31) is fixed on the inner face (11) of the door (6) and/or on the second coupling face (17*b*) of the coupling plate (17).

14. Oven according to claim 12, wherein the second gasket (31) is arranged, when the door (6) is closed, above the projecting portions (18) of the second support frame (13).

15. Oven according to claim 12, wherein the sealing device (21) comprises a third gasket (32), which is interposed between the inner face (11) of the door (6) and the second coupling face (17*b*) of the coupling plate (17), and extends, when the door (6) is closed, around part of the opening of the baking chamber (4).

* * * * *

UNITED STATES PATENT AND TRADEMARK OFFICE
CERTIFICATE OF CORRECTION

PATENT NO. : 9,609,878 B2  
APPLICATION NO. : 14/617039  
DATED : April 4, 2017  
INVENTOR(S) : Alberto Foda et al.

Page 1 of 1

It is certified that error appears in the above-identified patent and that said Letters Patent is hereby corrected as shown below:

In the Specification

Column 5 Line 1: please add number -- 6 -- between the words "door" and "also"

Signed and Sealed this
Eleventh Day of September, 2018

Andrei Iancu
*Director of the United States Patent and Trademark Office*